US007155519B2

United States Patent
Lo et al.

(10) Patent No.: US 7,155,519 B2
(45) Date of Patent: Dec. 26, 2006

(54) SYSTEMS AND METHODS FOR ENHANCING CONNECTIVITY BETWEEN A MOBILE WORKFORCE AND A REMOTE SCHEDULING APPLICATION

(75) Inventors: Edward Lo, Burnaby (CA); Fred Wu, Coquitlam (CA)

(73) Assignee: MDSI Software SRL (BB)

( * ) Notice: Subject to any disclaimer, the term of this patent is extended or adjusted under 35 U.S.C. 154(b) by 585 days.

(21) Appl. No.: 09/825,184

(22) Filed: Apr. 2, 2001

(65) Prior Publication Data

US 2002/0023157 A1   Feb. 21, 2002

Related U.S. Application Data

(60) Provisional application No. 60/193,834, filed on Mar. 31, 2000, provisional application No. 60/193,917, filed on Mar. 31, 2000, provisional application No. 60/193,832, filed on Mar. 31, 2000, provisional application No. 60/193,705, filed on Mar. 31, 2000, provisional application No. 60/193,833, filed on Mar. 31, 2000.

(51) Int. Cl.
*G06F 15/16* (2006.01)

(52) U.S. Cl. ............... 709/227; 709/202; 709/203; 709/228

(58) Field of Classification Search ........ 709/200–203, 709/217–219, 223–224, 227–229; 455/418–420, 455/414.1–414.2
See application file for complete search history.

(56) References Cited

U.S. PATENT DOCUMENTS

| | | | |
|---|---|---|---|
| 4,937,743 A | 6/1990 | Rassman et al. | 364/401 |
| 5,093,794 A | 3/1992 | Howie et al. | 364/468 |
| 5,168,451 A | 12/1992 | Bolger | 364/436 |
| 5,289,368 A | 2/1994 | Jordan et al. | 364/401 |
| 5,325,292 A | 6/1994 | Crockett | 364/401 |
| 5,355,511 A | 10/1994 | Hatano et al. | 455/11.1 |
| 5,428,546 A | 6/1995 | Shah et al. | 364/449 |
| 5,467,268 A | 11/1995 | Sisley et al. | 364/401 |
| 5,532,702 A | 7/1996 | Mintz | 342/463 |
| 5,615,121 A | 3/1997 | Babayev et al. | 395/209 |
| 5,623,404 A | 4/1997 | Collins et al. | 395/209 |
| 5,636,122 A | 6/1997 | Shah et al. | 364/449.1 |
| 5,655,118 A | 8/1997 | Heindel et al. | 395/614 |
| 5,737,728 A | 4/1998 | Sisley et al. | 705/8 |
| 5,758,313 A | 5/1998 | Shah et al. | 701/208 |
| 5,826,239 A | 10/1998 | Du et al. | 705/8 |
| 5,848,395 A | 12/1998 | Edgar et al. | 705/9 |

(Continued)

FOREIGN PATENT DOCUMENTS

DE   195 39 662 C2   10/1997

(Continued)

OTHER PUBLICATIONS

Keller, A.M., et al., "Zippering: Managing intermittent connectivity in DIANA", *Mobile Networks and Applications*, 1997, Baltzer Science Publishers, Netherlands, vol. 2, No. 4, pp. 357-364.

(Continued)

*Primary Examiner*—Bharat Barot
(74) *Attorney, Agent, or Firm*—Dorsey & Whitney LLP

(57) ABSTRACT

Systems and methods for enhancing connectivity are discussed. An illustrative aspect of the invention includes a method for enhancing connectivity. The method includes scheduling an order to be performed by a worker into a schedule, accessing the schedule by a mobile device via a server on the Internet, and substituting the schedule by a proxy to allow an application on the mobile device to interact with the proxy when the mobile device is temporarily disconnected from the schedule.

9 Claims, 2 Drawing Sheets

U.S. PATENT DOCUMENTS

| | | | |
|---|---|---|---|
| 5,870,545 A | 2/1999 | Davis et al. | 395/200.31 |
| 5,893,906 A | 4/1999 | Daffin et al. | 705/28 |
| 5,904,727 A | 5/1999 | Prabhakaran | 701/208 |
| 5,913,201 A | 6/1999 | Kocur | 705/9 |
| 5,920,846 A | 7/1999 | Storch et al. | 705/7 |
| 5,922,040 A | 7/1999 | Prabhakaran | 701/117 |
| 5,963,913 A | 10/1999 | Henneuse et al. | 705/9 |
| 5,970,466 A | 10/1999 | Detjen et al. | 705/8 |
| 6,016,477 A | 1/2000 | Ehnebuske et al. | 705/7 |
| 6,047,260 A | 4/2000 | Levinson | 705/9 |
| 6,070,144 A | 5/2000 | Ginsberg et al. | 705/9 |
| 6,092,048 A | 7/2000 | Nakaoka | 705/9 |
| 6,115,640 A | 9/2000 | Tarumi | 700/99 |
| 6,144,971 A | 11/2000 | Sunderman et al. | 707/500 |
| 6,278,978 B1 | 8/2001 | Andre et al. | 705/9 |
| 6,370,566 B1* | 4/2002 | Discolo et al. | 709/203 |
| 6,415,259 B1 | 7/2002 | Wolfinger et al. | 705/8 |
| 6,430,562 B1 | 8/2002 | Kardos et al. | 707/10 |
| 6,473,748 B1 | 10/2002 | Archer | 706/45 |
| 6,532,465 B1 | 3/2003 | Hartley et al. | 707/10 |
| 6,535,883 B1 | 3/2003 | Lee et al. | 707/100 |
| 6,546,364 B1 | 4/2003 | Smirnov et al. | 703/22 |
| 6,546,425 B1* | 4/2003 | Hanson et al. | 709/227 |
| 6,578,005 B1 | 6/2003 | Lesaint et al. | 705/8 |
| 6,633,900 B1 | 10/2003 | Khalessi et al. | 709/202 |
| 6,697,784 B1 | 2/2004 | Bacon et al. | 705/9 |
| 6,701,299 B1 | 3/2004 | Kraisser et al. | 705/8 |
| 6,721,288 B1* | 4/2004 | King et al. | 709/203 |
| 6,721,779 B1* | 4/2004 | Maffeis | 709/202 |
| 6,745,381 B1 | 6/2004 | Ehnebuske et al. | 717/100 |
| 6,754,321 B1* | 6/2004 | Innes et al. | 709/223 |
| 6,757,530 B1* | 6/2004 | Rouse et al. | 455/420 |
| 6,823,315 B1 | 11/2004 | Bucci et al. | 705/9 |
| 6,850,895 B1 | 2/2005 | Brodersen et al. | 705/9 |
| 2001/0037229 A1 | 11/2001 | Jacobs et al. | 705/8 |
| 2001/0047287 A1 | 11/2001 | Jacobs et al. | 705/9 |
| 2001/0047288 A1 | 11/2001 | Jacobs et al. | 705/9 |
| 2001/0049619 A1 | 12/2001 | Powell et al. | 705/9 |
| 2002/0007299 A1 | 1/2002 | Florence | 705/9 |
| 2002/0010610 A1 | 1/2002 | Jacobs et al. | 705/8 |
| 2002/0010615 A1 | 1/2002 | Jacobs | 705/9 |
| 2002/0016645 A1 | 2/2002 | Jacobs et al. | 700/100 |
| 2002/0035493 A1 | 3/2002 | Mozayeny et al. | 705/5 |
| 2002/0046073 A1 | 4/2002 | Indseth et al. | 705/8 |
| 2002/0065700 A1 | 5/2002 | Powelll et al. | 705/9 |
| 2002/0199182 A1 | 12/2002 | Whitehead | 725/1 |
| 2005/0027580 A1 | 2/2005 | Crici et al. | 705/8 |

FOREIGN PATENT DOCUMENTS

| | | |
|---|---|---|
| WO | WO 00/28451 A3 | 5/2000 |
| WO | WO 00/68856 | 11/2000 |
| WO | WO 00/68859 | 11/2000 |

OTHER PUBLICATIONS

Mazer, M.S., et al., "Writing the Web While Disconnected", *IEEE Personal Communications*, Oct. 1998, IEEE, USA, vol. 5, No. 5, pp. 35-41.

Alanko, T., et al., "Mowgli: Improvements for Internet Applications Using Slow Wireless Links", *Waves of the Year 2000+ PIMRC '97. The 8th IEEE International Symposium on Personal, Indoor and Mobile Radio Communications*, Technical Program Proceedings, vol. 3, pp. 1038-1042.

La Porta, T.F., et al., "Challenges for nomadic computing: Mobility management and wireless communications", *Journal of Special Topics in Mobile Network Applications*, Aug. 1996, Baltzer Science Publishers, Netherlands, vol. 1, No. 1, pp. 3-16.

Kleinrock, L., "Nomadicity: Anytime, anywhere in a disconnected world", *Journal of Special Topics in Mobile Networks and Applications*, Baltzer Science Publishers, Netherlands, vol. 1, No. 4, pp. 351-357, no date.

Mummert, L.B., et al., "Exploiting Weak Connectivity for Mobile File Access," Fifteenth AC Symposium on Operating Systems Principles, *Operating Systems Review*, Dec. 1995, vol. 29, No. 5, pp. 143-155.

Adhikari, R., "Scheduling Solutions", Information Week, informationweek.com, Apr. 1998. 7 pages.

Blumberg, D., "Optimizing Mobile Workforce", Leisure Publications, Feb. 1, 2001.

ClickSchedule, Products, Click Schedule Tour and Article Web pages, ClickService Software, Inc., clickservice.com/products, 2000 (retrieved Feb. 2005). 12 pages.

Gunes, E.D., "Workforce Scheduling", Department of Industrial Engineering Bilkent University, Apr. 1999. 1-11.

Henderson, T. P., "Scheduling Software Helps Webvan Meet 30-Minute Delivery Window", Stores Magazine, NRF Enterprises Inc., Jul. 2000. 2 pages.

ILOG.com, "ILOG Dispatcher Field Service Dispatcher", ILOG Worldwide (retrieved from archive.org), Dec. 2000 (retrieved Feb. 2005). 2 pages.

ILOG.com, ILOG World Leader in software components, Business Rules, Rule Engine, Rule Language, Rule Kit, Constraint Base Scheduling, ILOG Dispatcher Web pages, ilog.com/products/rules, 2000 (retrieved Feb. 2005). 21 pages.

Livneh, E., "Case Study: Automating Service Allocation and Scheduling", Association for Services Management International, afsmi.org, May 1997. pp. 1-5.

Marshak, R. T, "ClickSchedule: Completing the Online Buying Experience", ClickSoftware, Patrica Seybold Group, Oct. 1999. pp. 1-3.

MDSI Mobile Data Solutions, mdsi-advantex.com (retrieved from google.com and archive.org), Feb. 1998 (retrieved Apr. 2005). pp. 1-31.

Open Wave—Home and Shift Track Web pages, open-wave.com (retrieved form archive.org), Open Wave, Inc., 1999. 5 pages.

Padwick, G. et al, Special Edition Using Microsoft® Outlook® 2000, Que, ISBN 0-7897-1909-6, May 1999. 47 pages.

Scheduling Software Helps Webban Meet 30-Minute Delivery Windoe Stores Magazine, Jul. 2000.

Aytug, H. et al., "A Review of Machine Learning in Scheduling", IEEE Transactions on Engineering Management, vol. 41, No. 2, May 1994. pp. 165-171.

"Connectria Unveils ServeClick to Enable the Next Wave of E-Commerce—'E-Scheduling' of Services, Appointments & Reservations", Business Wire, New York, Jan. 4, 2000. Two pages.

"DeliveryNet for Home Delivery", www.Descartes.com, e-Fulfillment Solutions, Mar. 20, 2000. Nine pages.

De Serres, Y., "Simultaneous optimization of flow control and scheduling in queues", McGill University, Publication No. AAT NN72160, 1999. Abstract only, one page.

DiCarlo, L., "Connectria: E-schedulling is next big thing", eWeek, Mar. 20, 2000. pp. 1-3.

Domenjoud, E. et al., "Generating feasible schedules for a pick-up and delivery problem", Proceedings of CP, Technical Report 98-R-142, Apr. 1998. pp. 1-12.

Dumas, Y. et al., "Pickup and Delivery Problem with Time Windows", European Journal of Operational Research, vol. 54, No. 1, Sep. 1991. Abstract only. One page.

Marinho J. et al., "Decision Support System for Dynamic Production Scheduling", IEEE International Symposium on Assembly and Task Planning, Jul. 1999. pp. 424-429.

Martin, J., "Principles of Object-Oriented Analysis and Design", PTR Prentice Hall, New Jersey, 1993. pp. vii-xiii and 133-154.

McFeely, D.J. et al., "Scheduling to Achieve Multiple Criteria in an Air Force Depot CNC Machine Shop", Production and Inventory Management Journal, vol. 38, No. 1, First Quarter 1997. 72-79.

"MenuHunter.com to Provide the Ultimate in Online Restaurant Reservations Using ServeClick from Connectria; Service to Handle Complex, Real-World Needs of Restaurants & Patrons", Business Wire, New York, Feb. 1, 2000. Three pages.

Mitrovic-Minic, S., "Pickup and Delivery Problem with Time Windows: A Survey", SFU CMPT TR 1998-12, ftp://fas.sfu.ca/pub/cs/techreports/1998, May 1998. pp. 1-43.

Nanry, W.P. et al., "Solving the pickup and delivery problem with time windows using reactive tabu search", Transportation Research, Part B, Apr. 1999. pp. 107-121.

Panwalker, S.S. et al., "A Survey of Scheduling Rules", Operations Research, vol. 25, No. 1, Jan.-Feb. 1977. pp. 45-61.

Pierreval, H. et al., "Dynamic Selection of Dispatching Rules for Manufacturing System Scheduling", International Journal Production Research, vol. 35, No. 6, 1997. pp. 1575-1591.

"RestaurantRow.com Selects ServeClick from Connectria to Power its Advanced Online Restaurant E-Scheduling", PR Newswire, New York, Feb. 1, 2000. Three pages.

Sciacca, P., "Webvan Gets E-Business Software for Expansion", Supermarket News, Jan. 2000. Two pages.

"SERVECLICK", U.S. Trademark Application 75914207, Applicant: Catalyst Solutions Group, Inc., filed Feb. 9, 2000, abandoned Feb. 17, 2001. One page.

"ServeClick.com" Web pages retrieved from archive.org on Apr. 2006, ServeClick, 1999-2000. pp. 1-13.

Solomon, M.M., "Algorithms for the Vehicle Routing and Scheduling Problems with Time Window Constraints", Operations Research, vol. 35, No. 2, Mar.-Apr. 1987. pp. 254-265.

Tkach, D. et al., "Visual Modeling Technique Object Technology Using Visual Programming", Addison-Wesley, 1996. pp. 324-336.

"Vantive and MDSI to Provide Enterprise-Wide Wireless Field Service Solution", PR Newswire, New York, Oct. 26, 1998. pp. 1-3.

Witt, C.E., "Update: Material Handling in the Food Industry", Material Handling Engineering, vol. 54, No. 11, Oct. 1999. Eleven pages.

* cited by examiner

SYSTEMS AND METHODS FOR ENHANCING CONNECTIVITY BETWEEN A MOBILE WORKFORCE AND A REMOTE SCHEDULING APPLICATION

CROSS-REFERENCE TO RELATED APPLICATION

This application incorporates by reference and claims the benefit of U.S. Provisional Application No. 60/193,834, filed Mar. 31, 2000; U.S. Provisional Application No. 60/193,917, filed Mar. 31, 2000; U.S. Provisional Application No. 60/193,832, filed Mar. 31, 2000; U.S. Provisional Application No. 60/193,705, filed Mar. 31, 2000; and U.S. Provisional Application No. 60/193,833, filed Mar. 31, 2000.

TECHNICAL FIELD

The technical field relates generally to scheduling. More particularly, it pertains to updating a schedule when a mobile device of a worker has network coverage after being temporarily outside of the network coverage.

COPYRIGHT NOTICE—PERMISSION

A portion of the disclosure of this patent document contains materials which are subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice applies to the software and data as described below and in the drawings attached hereto: Copyright© 2001, MDSI Mobile Data Solutions Inc., All Rights Reserved.

BACKGROUND OF THE INVENTION

Suppose that to schedule a desired service to be performed, a customer calls a service organization to place an order for the desired service. The service organization schedules the work order. Then, a worker within the service organization performs the desired service.

The worker has a variety of equipment to help him perform his job. One type of equipment includes a device that allows him to continuously connect to the service organization so as to receive and to send information associated with assigned orders in his shift. To service the assigned orders, the worker typically travels to various destinations throughout a geographic area. Because of incomplete network coverage, as the worker travels to certain locations in the geographic area, he may become disconnected from the service organization. Such a disconnection frustrates the ability of the worker to provide information that may be pertinent to the service organization.

Thus, what is needed are systems and methods for enhancing the connectivity of a worker with a service organization in a mobile environment.

SUMMARY OF THE INVENTION

An illustrative aspect of the invention includes a system for enhancing connectivity over the Internet. The system includes a schedule having shifts of workers in which orders are assigned to be performed, a mobile device accessing the schedule by an application through the Internet, and a proxy that acts for the schedule when the mobile device is temporarily disconnected from the Internet.

Another illustrative aspect of the invention includes a method for enhancing connectivity. The method includes scheduling an order to be performed by a worker into a schedule, accessing the schedule by a mobile device via a server on the Internet, and substituting the schedule by a proxy to allow an application on the mobile device to interact with the proxy when the mobile device is temporarily disconnected from the schedule.

DETAILED DESCRIPTION OF THE INVENTION

Figure 1:
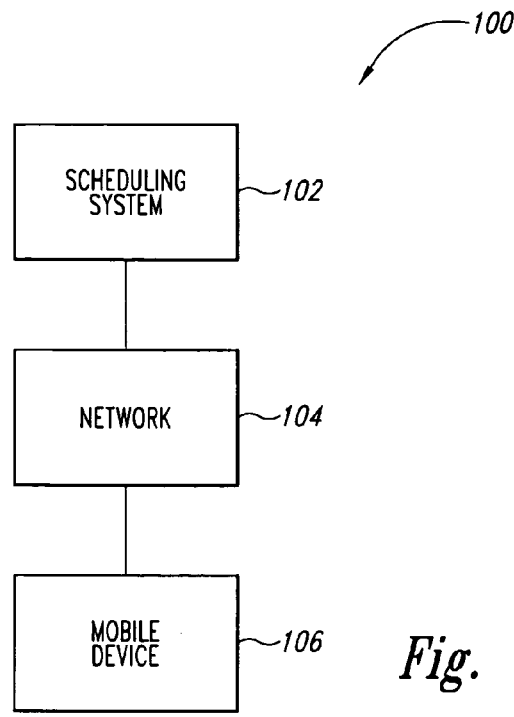
FIG. 1 is a block diagram of a system showing the relationship between a scheduling system and a mobile device of a mobile service representative according to one aspect of the present invention.

In the following detailed description of exemplary embodiments of the invention, reference is made to the accompanying drawings, which form a part hereof, and in which are shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

FIG. 1 is a block diagram of a system 100 showing the relationship between a scheduling system and a mobile device of a mobile service representative according to one aspect of the present invention. The system 100 includes a scheduling system 102. The scheduling system 102 manages the schedule of a workforce of a service organization. The service organization uses the scheduling system 102 to take reservations for orders from customers who wish to have services performed.

Typically, a customer calls the service organization to make a reservation. The service organization uses the scheduling system 102 to offer the customer a variety of appointment windows that fit the timing preferences of the customer. The appointment windows that are offered also fit the availability of the workforce of the service organization to perform the service. Once the customer selects an appointment window, the scheduling system 102 reserves the order to be performed within the time period specified by the appointment window.

The scheduling system 102 assigns the order to a worker of the workforce. The relationship between a worker of the workforce to the schedule is through one or more shifts. A shift is a time period that defines the beginning of a work period to the end of the work period. To assign the order to a worker, the scheduling system 102 assigns the order into the reservations that are in the shift of a worker. The worker, who commences his workday, looks at the information in his shift. His shift specifies the reservations in the order he is to perform them.

One way of sending and receiving the information regarding his shift is through a mobile device 106. One type of information that the worker receives from the scheduling system 102 includes an order summary. The order summary includes a brief description of the job he is to undertake to perform the service for a customer. A type of information that the worker sends to the scheduling system includes a timesheet. The timesheet includes the recording of the time of arrival and departure of the worker.

The mobile device 106 can be any suitable device that allows a worker to receive information from the scheduling system 102 and to send information to the scheduling system 102. One suitable example includes a laptop computer. Another suitable example includes a personal digital assistant.

The mobile device 106 is coupled to the scheduling system 102 through a network 104. The network 104 includes any wired or wireless networks that allow the mobile device 106 of the worker to be connected to the scheduling system 102.

Figure 2:
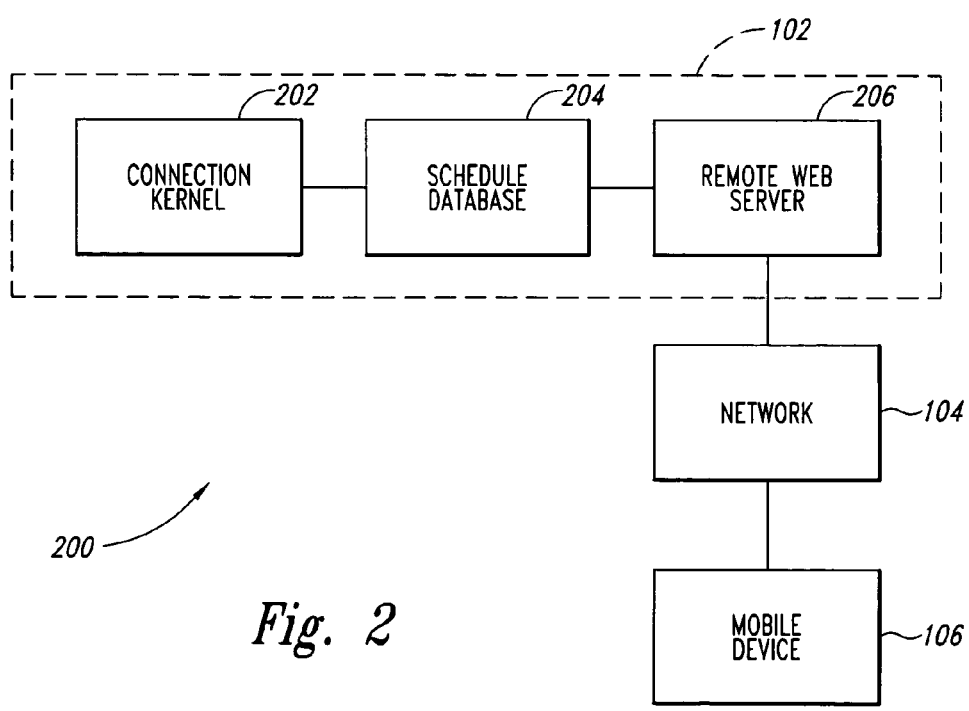
FIG. 2 is a block diagram of a system showing the scheduling system in greater detail according to one aspect of the present invention.

FIG. 2 is a block diagram of a system 200 showing the scheduling system 102 in greater detail according to one aspect of the present invention. The scheduling system 102 includes a schedule database 204. The schedule database 204 is a file composed of records, each containing shifts of workers, break times of workers, and other fields together with a set of operations for searching, sorting, recombining, and other functions.

The scheduling system 102 includes a remote Web server 206. The remote Web server 206 includes pieces of software that use Hypertext Transfer Protocol (HTTP) to serve up Hypertext Markup Language (HTML) documents and any associated files and scripts when requested by a client, such as a Web browser. The remote Web server 206 converts selective information from the schedule database 204 into HTML documents to present such information to the Web browser.

The scheduling system 102 includes a connection kernel 202. The connection kernel 202 helps to enhance the connection of the mobile device 106 to the scheduling system 102. The network 104 defines an area of coverage. Due to interference from urban structures and electromagnetic sources, such as buildings and radio frequency sources, the area of coverage may have holes depending on the location of the mobile device 106. A mobile device 106 that is within the area of coverage of the network 104 may send information to the scheduling system 102 and receive information from the scheduling system 102. If the mobile device 106 is not in the area of coverage of the network 104, the mobile device 106 may be unable to either send information to the scheduling system 102 or receive information from the scheduling system 102.

The embodiments of the present invention allow a worker to continue to use the mobile device 106 as if the mobile device 106 were connected to the scheduling system 102 when the mobile device 106 is not present in the area of coverage of the network 104. When the mobile device 106 is again within the area of coverage of the network 104, the embodiments of the present invention synchronize information between the scheduling system 102 and the mobile device 106 to provide an apparently seamless connectivity between the mobile device 106 and the scheduling system 102.

One example includes a worker in his automobile traveling from one job to the next while using his mobile device 106 to access the scheduling system 102. As he travels, various interference sources inhibit his ability to access the scheduling system 102. The embodiments of the present invention allow the worker to continue to use his mobile device 106 as if he were still connected to the scheduling system 102.

Figure 3:
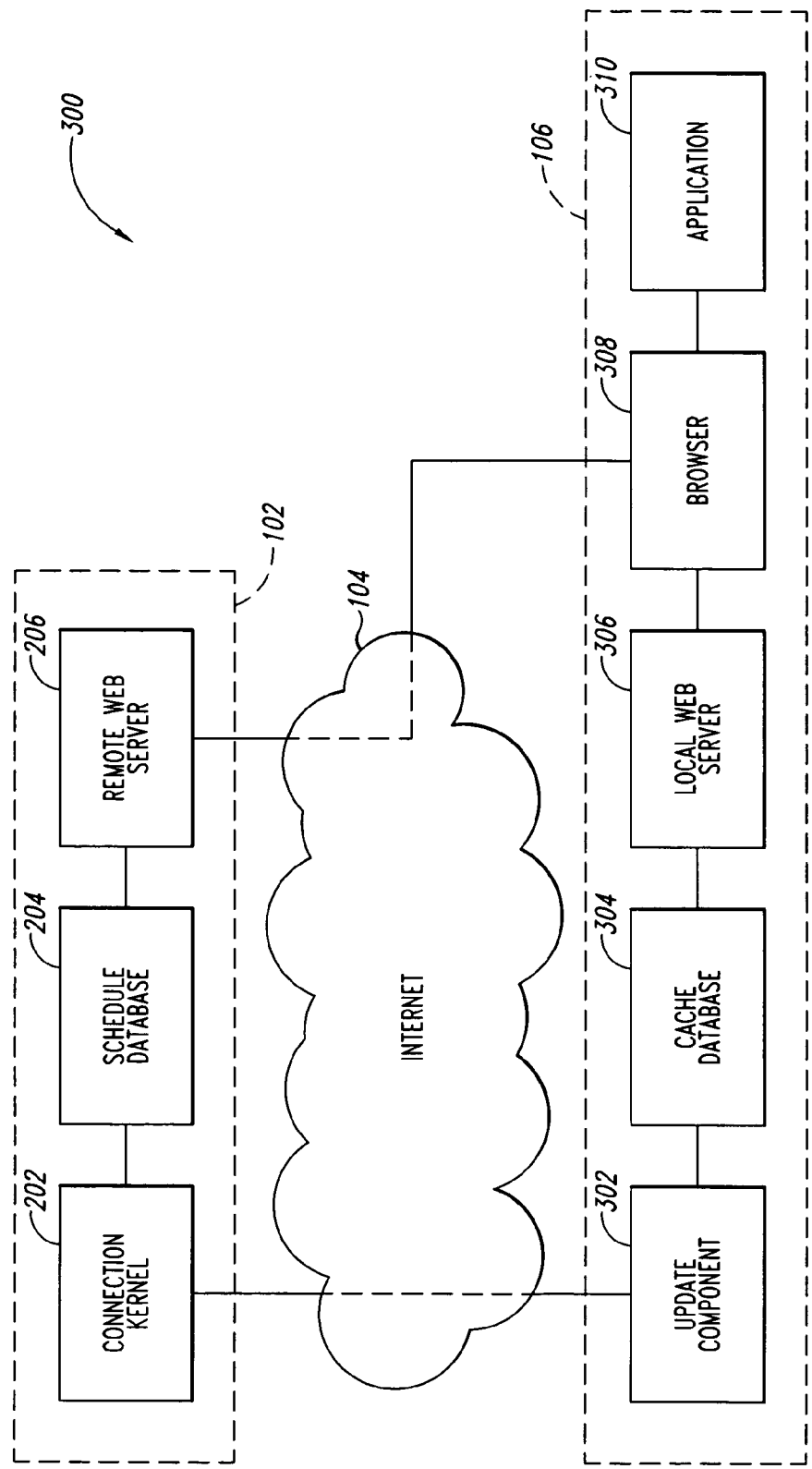
FIG. 3 is a block diagram of a system showing the mobile device in greater detail according to one aspect o the present invention.

FIG. 3 is a block diagram of a system 300 showing the mobile device 106 in greater detail according to one aspect of the present invention. The network 104 is shown as the Internet in FIG. 3 in one embodiment. Thus, the scheduling system 102 is coupled to the mobile device 106 using a TCP/IP protocol.

As discussed hereinbefore, the remote Web server 206 of the scheduling system 106 serves HTML documents to the mobile device 106. The mobile device 106 includes a browser 308. The browser 308 is a piece of software that lets a worker view HTML documents, such as order summaries, and access files and software related to those documents. The browser 308 allows downloading and transferring files, such as timesheets, and executing small programs, such as Java applets or ActiveX controls included by the scheduling system 102 in the documents.

The mobile device 106 includes an application 310. The application 310 interacts with the browser 308 to access the scheduling system 102. The application 310 includes pieces of software that are designed for the mobile worker. For example, the application 310 may include a piece of software that allows the worker to enter times into timesheets.

The mobile device 106 includes a cache database 304. The cache database 304 caches information received from the remote Web server 206 as well as information to be sent from the application 310 to the scheduling system 102. Suppose that the worker travels to a location that is not covered by the network 104, the cache database 304 in combination with a proxy for the scheduling system 102 allows the worker to continue to work with the mobile device 106 as if the mobile device 106 were still connected to the scheduling system 102. In one embodiment, the cache database is a Java Database Connectivity (JDBC)-compliant database.

In one embodiment, the proxy includes a local Web server 306. The local Web server 306 enables the worker to continue his interactions as if he were still connected to the scheduling system 102. The worker may continue to enter and to modify data on Web pages presented to the browser 308. The worker may also submit changes made to data in fields on the Web pages.

Information generated by the worker through the application 310 is kept in the cache database. The cache database includes a predetermined set of HTML documents that the worker is likely to access so as to give an apparent connection to the scheduling system 102 when the mobile device is temporarily disconnected from the scheduling system 102. When the mobile device 106 comes again within the coverage area of the network 104, the connection of the mobile device 106 to the scheduling system is established as if the worker has been connected to the scheduling system 102 without any disruption in the coverage of the network 104.

The mobile device 106 also includes an update component 302. The update component 302 communicates with the connection kernel 202 to synchronize the states of data between the scheduling system 102 and the mobile device 106. In one embodiment, the update component 302 bypasses the remote Web server 206 to communicate with the connection kernel 202. Such technique of bypassing enhances the connectivity of the mobile device 106 to the scheduling system 102 because the area of coverage of the network 104 is not complete.

In one embodiment, the update component 302 is implemented using a Java Servlet. The Java Servlet stores the results of the interactions of the worker while the mobile device 106 is disconnected from the scheduling system 102 in the cache database 304. When the mobile device 106 is again connected to the scheduling system 102 via the network 104, the Java Servlet communicates with the connection kernel 202 by bypassing the remote Web server 206 to update the schedule database 204. In another embodiment, the Java Servlet communicates with the connection kernel 202 via the remote Web server 206 to update the schedule database 204.

In one embodiment, the application 310 is a Web application. The Web application interacts with the local Web server 306 when the mobile device 106 is not within the area of coverage of the network 104. The local Web server 306 includes a piece of software that acts as a Java Virtual Machine. When the mobile device 106 is connected to the scheduling system 102, the remote Web server 206 pushes a Java Servlet, such as the update component 302, to run on the local Web server 306. When the remote Web server 206 sends Web pages, these Web pages are cached by the cache database 304. The Web application sets its URL to the local Web server 306. The local Web server 306 interfaces and communicates with the remote Web server 206 for new Web pages and to synchronize data.

CONCLUSION

What has been discussed hereinbefore is a technique for enhancing the connectivity of a worker, who may be traveling from one job site to another, to a scheduling system. The worker may have a mobile device that is coupled to the scheduling system through a network. But the network may have an incomplete coverage area. The situation is made worse when the mobile device runs Web-based applications that require constant connection to the Internet to access the Web server running on the Web server. The embodiments of the invention enhance the connectivity of the worker to the scheduling system without requiring the mobile device of the worker to have a constant connection to the Internet.

Although the specific embodiments have been illustrated and described herein, it will be appreciated by those of ordinary skill in the art that any arrangement calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

We claim:

1. A system for enhancing connectivity over the Internet, comprising:

a schedule having shifts of workers in which orders are assigned to be performed;

a mobile device accessing the schedule by an application through the Internet;

a proxy included in the mobile device that acts for the schedule when the mobile device is temporarily disconnected to the Internet; and a bypass mechanism to allow the proxy to update the schedule without going through a web server when the mobile device is again connected from the Internet.

2. The system of claim 1, wherein the proxy includes a server that services the application as if the application were connected to the schedule when the mobile device is temporarily disconnected from the schedule.

3. The system of claim 1, wherein when the mobile device is again connected to the Internet, the proxy includes a Servlet that communicates with the schedule to update the schedule with information generated by the application while the mobile device is temporarily disconnected from the Internet.

4. The system of claim 1, wherein the proxy includes a database that stores information generated by the application while the mobile device is temporarily disconnected from the schedule.

5. A method for enhancing connectivity, comprising:

scheduling an order to be performed by a worker into a schedule;

accessing the schedule by a mobile device via a server on the Internet;

substituting the schedule by a proxy included in the mobile device to allow an application on the mobile device to interact with the proxy when the mobile device is temporarily disconnected from the schedule; and bypassing the server to update the schedule via the Internet with information generated by the application when the mobile device was previously temporarily disconnected from the Internet but is now connected to the Internet.

6. The method of claim 5, wherein substituting includes serving by a server residing on the mobile device to service the application as if the application were interacting with the schedule when the mobile device is temporarily disconnected from the schedule.

7. The method of claim 5, wherein when the mobile device is again connected to the schedule, the method of claim 5 further comprising updating the schedule with information generated by the application while the mobile device is temporarily disconnected from the schedule.

8. The method of claim 5, further comprising caching information that is generated by the application when the mobile device is temporarily disconnected from the Internet.

9. A computer readable medium having instructions stored thereon for causing a computer to perform a method for enhancing connectivity, comprising:

scheduling an order to be performed by a worker into a schedule;

accessing the schedule by a mobile device via a server on the Internet;

substituting the schedule by a proxy included in the mobile device to allow an application on the mobile device to interact with the proxy when the mobile device is temporarily disconnected from the schedule; and bypassing the server to update the schedule via the Internet with information generated by the application when the mobile device was previously temporarily disconnected from the Internet but is now connected to the Internet.

* * * * *